United States Patent
Higuchi et al.

(10) Patent No.: US 11,403,947 B2
(45) Date of Patent: Aug. 2, 2022

(54) SYSTEMS AND METHODS FOR IDENTIFYING AVAILABLE PARKING SPACES USING CONNECTED VEHICLES

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 74 days.

(21) Appl. No.: 17/026,449

(22) Filed: Sep. 21, 2020

(65) Prior Publication Data

US 2021/0319697 A1    Oct. 14, 2021

Related U.S. Application Data

(60) Provisional application No. 63/009,903, filed on Apr. 14, 2020.

(51) Int. Cl.
*G08G 1/14* (2006.01)
*G06K 9/62* (2022.01)

(52) U.S. Cl.
CPC .......... *G08G 1/141* (2013.01); *G06K 9/6277* (2013.01); *G06K 9/6288* (2013.01); *G08G 1/145* (2013.01)

(58) Field of Classification Search
CPC ...... G08G 1/141; G08G 1/145; G06K 9/6277; G06K 9/6288
See application file for complete search history.

(56) References Cited

U.S. PATENT DOCUMENTS 8,797,187 B2    8/2014 Harber et al.
9,129,524 B2    9/2015 Delibaltov et al.
(Continued)

OTHER PUBLICATIONS

Wojke et al., "Simple online and real-time tracking with a deep association metric," found at: arXiv:1703.07402v1 [cs.CV] Mar. 21, 2017.
Guo et al., "Monocular Depth Estimation Using Synthetic Images with Shadow Removal," Proceedings of the IEEE International Conference on Intelligent Transportation Systems (ITSC), 2019.
(Continued)

*Primary Examiner* — Mohamed Barakat
(74) *Attorney, Agent, or Firm* — Christopher G. Darrow; Darrow Mustafa PC (57) ABSTRACT

Systems and methods described herein relate to identifying available parking spaces using connected vehicles. One embodiment performs one of (1) receiving, from a connected vehicle, vehicle position data and vehicle detection and tracking data including at least one bounding box transition event in which a bounding box associated with a particular detected parked vehicle crosses an image-frame boundary; and (2) receiving, from the connected vehicle, the vehicle position data and sensor data, performing object detection and tracking on the sensor data to generate the vehicle detection and tracking data, and detecting the at least one bounding box transition event; generates updated parking-space availability data by performing map matching to associate the vehicle position data and the at least one bounding box transition event with parking spaces in a parking map; and transmits the updated parking-space availability data to one or more participating connected vehicles.

14 Claims, 9 Drawing Sheets

(56) References Cited

U.S. PATENT DOCUMENTS

| | | | |
|---|---|---|---|
| 10,354,531 B1* | 7/2019 | Bronder | G08G 1/141 |
| 11,062,156 B1* | 7/2021 | Vallance | G06N 20/00 |
| 2012/0056758 A1 | 3/2012 | Kuhlman et al. | |
| 2013/0057686 A1 | 3/2013 | Gene et al. | |
| 2015/0086071 A1* | 3/2015 | Wu | G06T 15/205 |
| | | | 382/103 |
| 2016/0140845 A1 | 5/2016 | Agrawal et al. | |
| 2018/0232583 A1* | 8/2018 | Wang | G06K 9/6256 |
| 2018/0232584 A1* | 8/2018 | Pathangay | G08G 1/142 |
| 2019/0236951 A1* | 8/2019 | Mason | G08G 1/143 |
| 2019/0294889 A1* | 9/2019 | Sriram | G06V 40/20 |
| 2021/0149415 A1* | 5/2021 | Bush | G01C 21/30 |

OTHER PUBLICATIONS

Xiao Chen et al., "Crowdsourcing for On-Street Smart Parking," DIVANet '12, Oct. 21-22, 2012, found at https://dl.acm.org/doi/pdf/10.1145/2386958.2386960.

Mathur, et al. "ParkNet: drive-by sensing of road-side parking statistics," in Proceedings of the 8th International Conference on Mobile Systems, Applications, and Services (ACM MobiSys), pp. 123-136, 2010.

Higuchi et al., "A Collaborative Approach to Finding Available Parking Spots," in Proceedings of the 2019 90th IEEE Vehicular Technology Conference (VTC2019-Fall), 2019.

U.S. Appl. No. 16/443,087 titled, "Cooperative Parking Space Search by A Vehicular Micro Cloud", filed Jun. 17, 2019.

* cited by examiner

SYSTEMS AND METHODS FOR IDENTIFYING AVAILABLE PARKING SPACES USING CONNECTED VEHICLES

CROSS-REFERENCE TO RELATED APPLICATION

This application claims the benefit of U.S. Provisional Patent Application No. 63/009,903, "Systems and Methods for Identifying Available Parking Spaces Using Connected Vehicles," filed Apr. 14, 2020, which is incorporated by reference herein in its entirety.

TECHNICAL FIELD

The subject matter described herein relates in general to vehicle parking availability systems and, more specifically, to systems and methods for identifying available parking spaces using connected vehicles.

BACKGROUND

The wasted time and stress associated with searching for an available parking space has been a major challenge for motorists for decades. Some technological solutions have been proposed and implemented that make use of stationary surveillance cameras, cameras mounted on connected vehicles, or a combination of the two to identify available parking spaces in real time and to communicate that information to motorists who are searching for an available space. Existing parking availability systems suffer from a number of shortcomings, however.

SUMMARY

Embodiments of a system for identifying available parking spaces using connected vehicles are presented herein. In one embodiment, the system comprises one or more processors and a memory communicably coupled to the one or more processors. The memory stores an input module including instructions that when executed by the one or more processors cause the one or more processors to perform one of (1) receiving, from a connected vehicle, vehicle position data and vehicle detection and tracking data including at least one bounding box transition event in which a bounding box associated with a particular one of one or more detected parked vehicles in a vicinity of the connected vehicle crosses an image-frame boundary over a sequence of image frames; and (2) receiving, from the connected vehicle, the vehicle position data and sensor data, performing object detection and tracking on the sensor data to generate the vehicle detection and tracking data, and detecting, from the vehicle detection and tracking data, the at least one bounding box transition event. The memory also stores a map-matching module including instructions that when executed by the one or more processors cause the one or more processors to generate updated parking-space availability data for a parking facility by performing map matching to associate the vehicle position data and the at least one bounding box transition event with one or more parking spaces in a parking map that corresponds to the parking facility. The memory also stores a communication module including instructions that when executed by the one or more processors cause the one or more processors to transmit the updated parking-space availability data for the parking facility to one or more participating connected vehicles.

Another embodiment is a non-transitory computer-readable medium for identifying available parking spaces using connected vehicles and storing instructions that when executed by one or more processors cause the one or more processors to perform one of (1) receiving, from a connected vehicle, vehicle position data and vehicle detection and tracking data including at least one bounding box transition event in which a bounding box associated with a particular one of one or more detected parked vehicles in a vicinity of the connected vehicle crosses an image-frame boundary over a sequence of image frames; and (2) receiving, from the connected vehicle, the vehicle position data and sensor data, performing object detection and tracking on the sensor data to generate the vehicle detection and tracking data, and detecting, from the vehicle detection and tracking data, the at least one bounding box transition event. The instructions also cause the one or more processors to generate updated parking-space availability data for a parking facility by performing map matching to associate the vehicle position data and the at least one bounding box transition event with one or more parking spaces in a parking map that corresponds to the parking facility. The instructions also cause the one or more processors to transmit the updated parking-space availability data for the parking facility to one or more participating connected vehicles.

Another embodiment is a method of identifying available parking spaces using connected vehicles, the method comprising performing one of (1) receiving, from a connected vehicle, vehicle position data and vehicle detection and tracking data including at least one bounding box transition event in which a bounding box associated with a particular one of one or more detected parked vehicles in a vicinity of the connected vehicle crosses an image-frame boundary over a sequence of image frames; and (2) receiving, from the connected vehicle, the vehicle position data and sensor data, performing object detection and tracking on the sensor data to generate the vehicle detection and tracking data, and detecting, from the vehicle detection and tracking data, the at least one bounding box transition event. The method also includes generating updated parking-space availability data for a parking facility by performing map matching to associate the vehicle position data and the at least one bounding box transition event with one or more parking spaces in a parking map that corresponds to the parking facility. The method also includes transmitting the updated parking-space availability data for the parking facility to one or more participating connected vehicles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

In various embodiments described herein, improved image-processing techniques and the mitigation of vehicle positioning errors help to overcome the shortcomings of existing parking availability systems. In various embodiments, a parking availability system is implemented in a cloud server or an edge server. Depending on the embodiment, the parking availability system can receive vehicle detection and tracking data from one or more connected vehicles with which it communicates over a network, or the parking availability system can receive raw sensor data (e.g., image data) from the connected vehicles, and the parking availability system processes the raw sensor data to generate the vehicle detection and tracking data. The vehicle detection and tracking data includes detected parked vehicles (enclosed within respective bounding boxes) in the vicinity of a reporting connected vehicle that are tracked over time (e.g., over a sequence of adjacent captured image frames). Whether the vehicle detection and tracking data is provided by the connected vehicles or generated from the raw sensor data received at the server, the vehicle detection and tracking data associated with a given connected vehicle can include a bounding box transition event. Herein, a "bounding box transition event" refers to a situation in which a bounding box associated with a particular detected and tracked parked vehicle among one or more detected and tracked parked vehicles in the vicinity of the connected vehicle crosses an image-frame boundary over a sequence of image frames.

A bounding box transition event can occur in different ways, depending on the orientation of the camera(s) on the connected vehicle and how the image-frame boundaries are defined. For example, when a connected vehicle drives through a parking garage or parking lot and passes parked vehicles on either side, a front-facing vehicle camera will capture parked vehicles in the vicinity that, over a sequence of successive image frames, pass out of the field of view of the camera beyond the right and left edges of the image frame. In this situation, a detected and tracked parked vehicle enclosed within a bounding box crosses the left or right edge of the image frame (the relevant image-frame boundary), vanishing from view over the sequence of image frames captured by the front-facing camera. Such a bounding box transition event may be termed a "bounding box vanishing event."

When a connected vehicle drives through a parking garage or parking lot and passes parked vehicles on either side, a rear-facing vehicle camera will capture parked vehicles in the vicinity that, over a sequence of successive image frames, enter the field of view of the camera across the right and left edges of the image frame. In this situation, a detected and tracked parked vehicle enclosed within a bounding box crosses the left or right edge of the image frame (the relevant image-frame boundary), coming into view over the sequence of image frames captured by the rear-facing camera. Such a bounding box transition event may be termed a "bounding box entry event."

In some embodiments, a connected vehicle can include a side camera, and an image-frame boundary can be defined as the right and/or left edge of the image frame, or one or more predetermined image-frame boundaries can be defined within the image frame as vertical lines that lie between the left and right edges of the image frame. Various kinds of bounding box transition events can be defined in terms of the predetermined image-frame boundaries.

In various embodiments, the parking availability system uses vehicle position data received from the connected vehicles and the bounding box transition events identified in the vehicle detection and tracking data to associate the vehicle position data and the bounding box transition events with specific parking spaces in a parking map that corresponds to a parking facility. Herein, this process is referred to as "map matching." As discussed in greater detail below, based on the system's knowledge of the field of view of a given vehicle camera and geometric calculations based on a connected vehicle's reported position and pose/heading, the bounding box transition events provide positional points of reference that enable the system to ascertain which specific parking spaces in the parking map are occupied and which are vacant. The map-matching process permits the system to update the parking-space availability data for a parking facility (e.g., a parking garage or a parking lot).

Once the parking availability system has updated its parking-space availability data for the parking facility, the system can transmit the updated parking-space availability data to one or more participating connected vehicles. In some embodiments, participating in this parking-space-availability service involves a subscription. The drivers or autonomous navigation systems of the connected vehicles receiving the updated parking-space availability data can use that information to locate a vacant (available) parking space within the parking facility.

In some embodiments, the parking availability system additionally applies error mitigation techniques to compensate for errors or inaccuracy in the vehicle position data the system receives from the connected vehicles. In still other embodiments, the updated parking-space availability data can be refined by fusing it with historical parking-space availability data for the parking facility before the updated parking-space availability data is transmitted to the participating connected vehicles. In some embodiments, the parking availability system avoids double counting detected parked vehicles in the vicinity of a reporting connected vehicle by filtering out (removing from consideration) detected parked vehicles whose associated bounding boxes are smaller than a predetermined size threshold (e.g., vehicles that, in the image data, are distant in the scene and are, consequently, relatively small in size).

Figure 1:
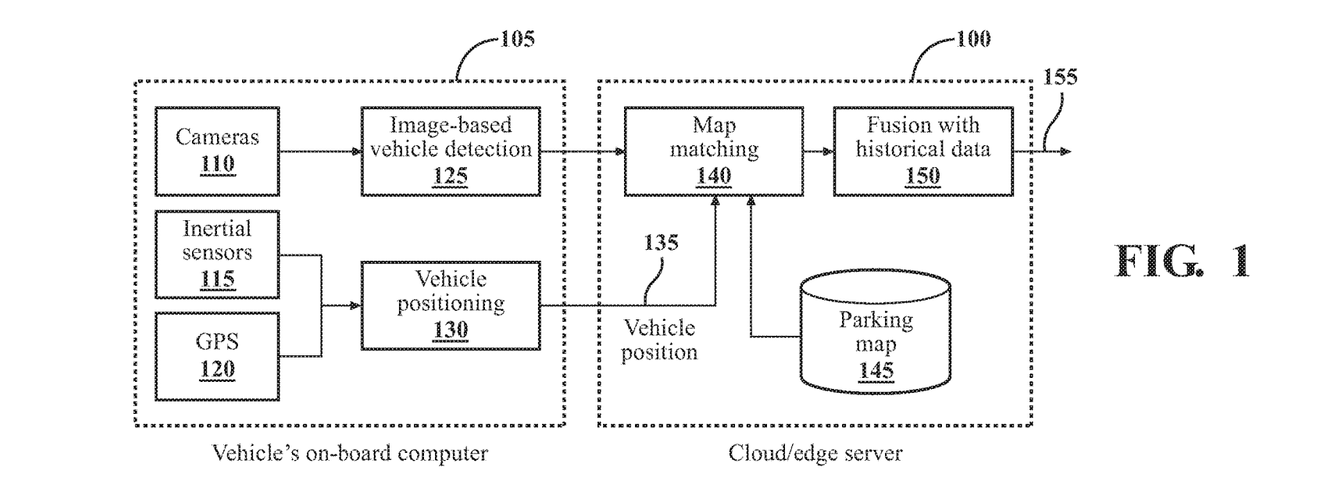
FIG. 1 is block diagram of a parking availability system in communication with a vehicle computing system of a connected vehicle, in accordance with an illustrative embodiment of the invention.

Referring to FIG. 1, it is a block diagram of a parking availability system 100 in communication with a vehicle computing system 105 of a participating connected vehicle, in accordance with an illustrative embodiment of the invention. Vehicle computing system 105, which, in this embodiment, supports parking availability system 100 by performing image-based vehicle detection 125 and vehicle positioning 130, includes environmental sensors such as cameras 110, inertial sensors 115, and a GPS unit 120. The cameras 110 output image data with which the vehicle computing system 105 performs image-based vehicle detection 125. Image-based vehicle detection 125 includes detecting parked vehicles in the vicinity (e.g., within about 100 m, depending on the embodiment) of the connected vehicle, associating a bounding box with each detected parked vehicle, and tracking the detected parked vehicles over a sequence of image frames (i.e., keeping track of the detected parked vehicles as the connected vehicle continues to move relative to the detected parked vehicles). One example of a real-time object-detection algorithm that can be deployed in vehicle computing system 105 is known in the art as "YOLO" ("You Only Look Once"). Image-based vehicle detection 125 produces vehicle detection and tracking data that can include one or more bounding box transition events. The vehicle detection and tracking data, including the one or more detected bounding box transition events, is transmitted to the parking availability system 100 hosted by the cloud or edge server frequently as it is updated.

Vehicle positioning 130 takes measurements from GPS unit 120 and/or inertial sensors 115 as input and estimates the position and heading angle (pose) of the connected vehicle. In the case of a parking structure where GPS signals are not available, the vehicle may use alternative indoor positioning techniques. Such techniques can include, for example, a combination of inertial sensors 115 and a map-matching technique, the use of cameras, radar, and/or Light Detection and Ranging (LIDAR) sensors as additional input sources, etc. The vehicle positioning data produced by vehicle positioning 130 is also transmitted frequently to the parking availability system 100.

Parking availability system 100, in this embodiment, includes map matching 140, one or more parking maps 145 (e.g., a parking map corresponding to each of a plurality of parking facilities in a particular geographic region), and fusion with historical data 150. The fusion operation is optional and is not included in every embodiment. Map matching 140 takes, as input, the vehicle detection and tracking data and the vehicle position data received from vehicle computing system 105 of the connected vehicle and associates these measurements with a parking map 145 that describes locations of parking spaces within a parking facility. As a result, the system can determine the availability (occupancy status) of each parking space within the parking facility. In summary, map matching 140 associates the vehicle position data and one or more detected bounding box transition events in the vehicle detection and tracking data with one or more parking spaces in a parking map 145 that corresponds to a parking facility.

In some embodiments, parking availability system 100 includes fusion with historical data 150. This optional operation fuses the latest parking-space availability measurements from participating connected vehicles with historical parking availability data to further refine the accuracy of the updated parking-space availability data 155 that is ultimately transmitted to the participating connected vehicles. The refined updated parking-space availability data 155 can be used to generate parking availability guidance to the one or more participating connected vehicles.

Figure 2:
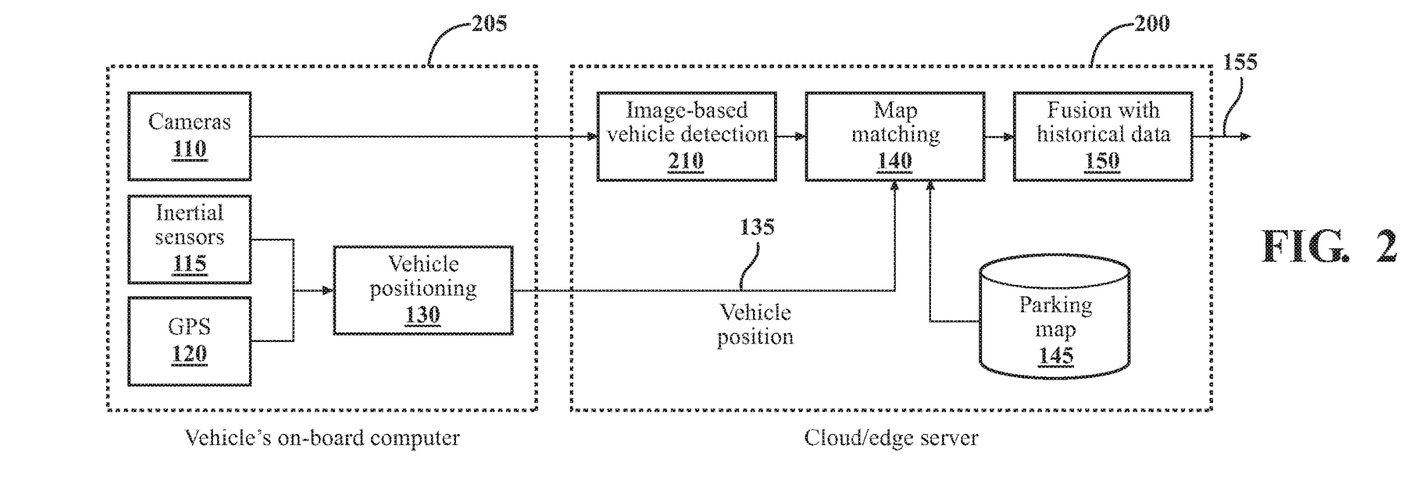
FIG. 2 is block diagram of a parking availability system in communication with a vehicle computing system of a connected vehicle, in accordance with another illustrative embodiment of the invention.

FIG. 2 is block diagram of a parking availability system 200 in communication with a vehicle computing system 205 of a connected vehicle, in accordance with another illustrative embodiment of the invention. This embodiment is similar to that discussed above in connection with FIG. 1, except that the participating connected vehicle's computing system 205 does not have sufficient computational resources to process images locally (i.e., to perform object detection and tracking of parked vehicles in the vicinity of the connected vehicle). To compensate for the lack of computational resources at the connected vehicle, image-based vehicle detection 210 is performed at the cloud or edge server as part of the parking availability system 200. In this embodiment, parking availability system 200 receives sensor data (e.g., images captured by cameras 110) from vehicle computing system 205, and parking availability system 200 processes the sensor data to perform object detection and tracking of parked vehicles in the vicinity of the connected vehicle, thereby producing, at the server, the vehicle detection and tracking data discussed above in connection with FIG. 1. As also discussed above, the resulting vehicle detection and tracking data can include one or more bounding box transition events that provide positional points of reference to the parking availability system 200 to assist the system in ascertaining, through map matching, the occupancy status of parking spaces in a parking facility.

Figure 3:
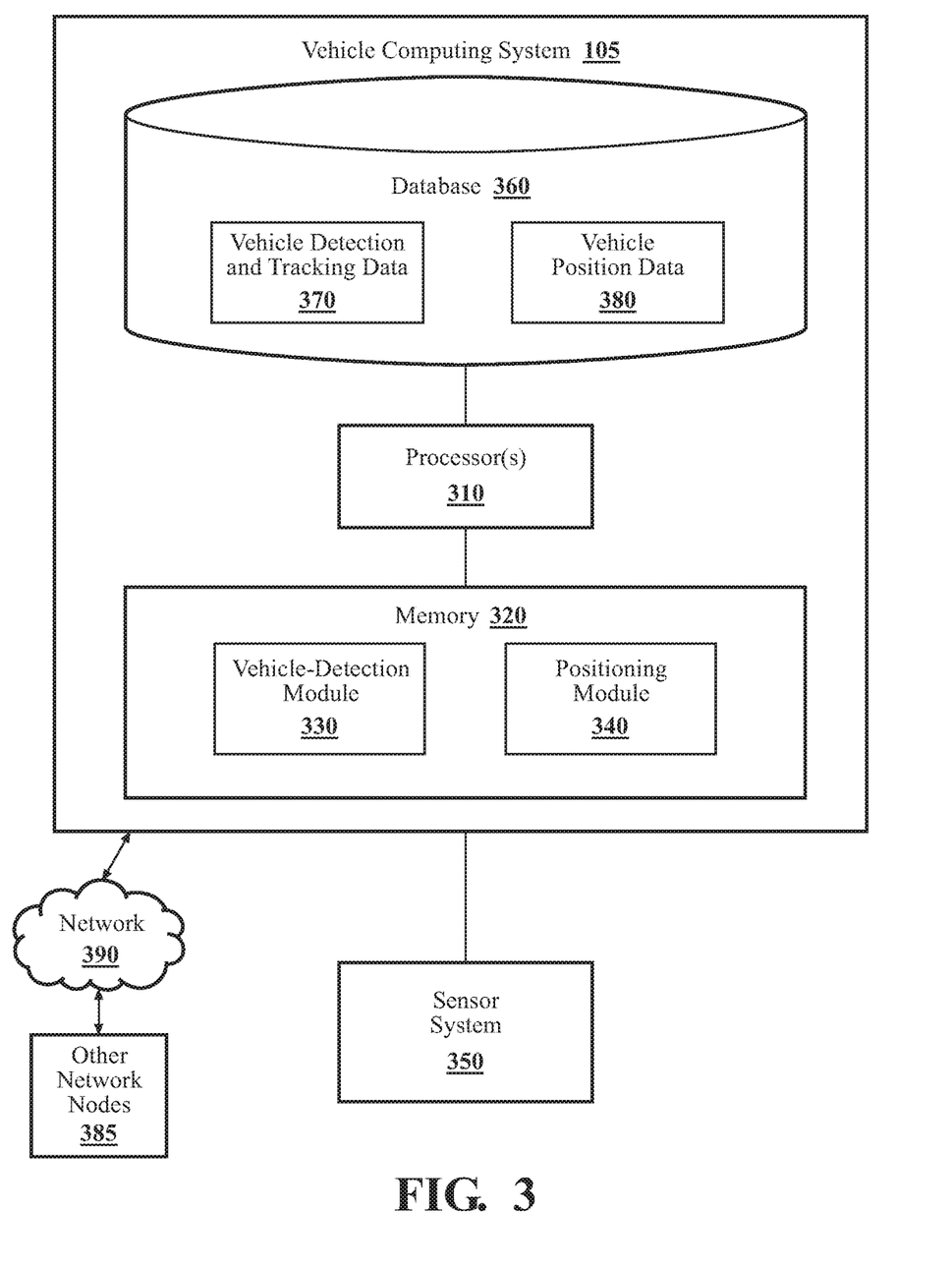
FIG. 3 is a functional block diagram of a vehicle computing system that operates in conjunction with a parking availability system, in accordance with an illustrative embodiment of the invention.

FIG. 3 is a functional block diagram of a vehicle computing system 105 that operates in conjunction with a parking availability system 100, in accordance with an illustrative embodiment of the invention. In the embodiment of FIG. 3, vehicle computing system 105 includes one or more processors 310 and a memory 320. The memory 320 stores a vehicle-detection module 330 and a positioning module 340. The memory 320 is a random-access memory (RAM), read-only memory (ROM), a hard-disk drive, a flash memory, or other suitable non-transitory memory for storing the modules 330 and 340. The vehicle-detection module 330 can include, for example, program instructions that, when executed by the one or more processors 310, cause the one or more processors 310 to perform the functions associated with image-based vehicle detection 125 (i.e., objection detection and tracking of parked vehicles in the vicinity of the connected vehicle that hosts vehicle computing system 105) described above in connection with FIG. 1. The positioning module 340 can include, for example, program instructions that, when executed by the one or more processors 310, cause the one or more processors 310 to perform the functions associated with vehicle positioning 130 described above. FIG. 3 also corresponds closely to vehicle computing system 205, except that vehicle computing system 205 does not include vehicle-detection module 330 for reasons explained above in connection with FIG. 2.

As also shown in FIG. 3, the vehicle computing system 105 may communicate with and receive data (e.g., camera image data and GPS positioning data) from a sensor system 350 associated with the connected vehicle hosting the vehicle computing system 105. The vehicle computing system 105 may store the vehicle detection and tracking data 370 and the vehicle position data 380 in a database 360. In some embodiments, the vehicle detection and tracking data 370 and the vehicle position data 380 can include other kinds of sensor data from sensor system 350, such as LIDAR data, radar data, and/or sonar data.

As also shown in FIG. 3, vehicle computing system 105 can communicate with other network nodes 385, including parking availability system 100, over a network 390. In some embodiments, the other network nodes 385 can include other connected vehicles. Vehicle computing system 105 can access the cloud or edge server (parking availability system 100) by way of vehicular networks such as cellular networks, dedicated short-range communication (DSRC), Wi-Fi, etc. In other embodiments, some or all of the functionalities performed by the server (e.g., map matching and/or fusion of the latest availability measurements with historical data) can instead be performed in a distributed-computing architecture by a group of participating connected vehicles within the same parking facility.

Figure 4:
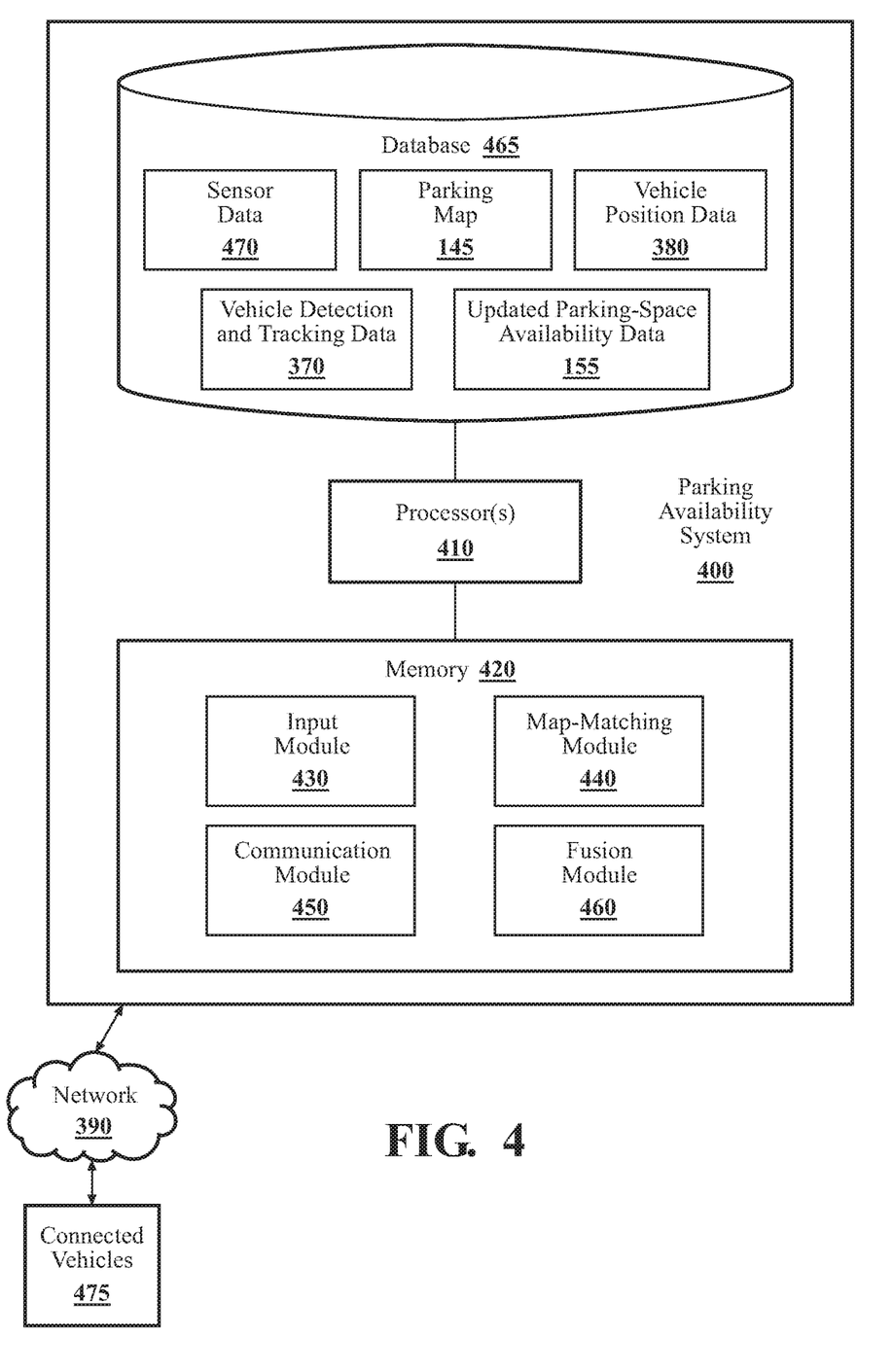
FIG. 4 is a functional block diagram of a parking availability system, in accordance with illustrative embodiments of the invention.

FIG. 4 is a functional block diagram of a parking availability system 400, in accordance with illustrative embodiments of the invention. As discussed further below, FIG. 4 applies to the embodiment discussed above in connection with FIG. 1 (parking availability system 100) and to the embodiment discussed above in connection with FIG. 2 (parking availability system 200). In the embodiment of FIG. 4, parking availability system 400 includes one or more processors 410 and a memory 420. The memory 420 stores an input module 430, a map-matching module 440, a communication module 450, and a fusion module 460. The memory 420 is a random-access memory (RAM), read-only memory (ROM), a hard-disk drive, a flash memory, or other suitable non-transitory memory for storing the modules 430, 440, 450, and 460. The modules 430, 440, 450, and 460 can include, for example, program instructions that, when executed by the one or more processors 410, cause the one or more processors 410 to perform the various functions described herein.

As indicated in FIG. 4, parking availability system 400 can store, in a database 465, vehicle detection and tracking data 370 (whether received from one or more connected vehicles 475 or generated at the server by processing sensor data 470 received from the connected vehicles 475), vehicle position data 380 received from one or more connected vehicles 475, sensor data 470 received from one or more connected vehicles 475 (in the embodiment discussed above in connection with FIG. 2), and one or more parking maps 145. For example, each parking map 145 can correspond to a particular parking facility, such as a parking garage or an outdoor parking lot. Parking availability system 400 can also store updated parking-space availability data 155 (output data) in database 465. As also shown in FIG. 4, parking availability system 400 can communicate with one or more connected vehicles 475 via a network 390 using one or more of the networking technologies discussed above in connection with FIG. 3.

Input module 430 generally includes instructions that when executed by the one or more processors 410 cause the one or more processors 410 to prepare input data for processing by map-matching module 440 and, in some embodiments, fusion module 460. The specific functions performed by input module 430 differ depending on whether a given participating connected vehicle 475 includes image-based vehicle detection 125 functionality, as in the embodiment discussed above in connection with FIG. 1, or whether the participating connected vehicle 475 sends only vehicle position data 380 and sensor data 470 (e.g., image data) to parking availability system 400, as in the embodiment discussed above in connection with FIG. 2. Input module 430 thus performs either (1) receiving, from a connected vehicle 475, vehicle position data 380 and vehicle detection and tracking data 370 including at least one bounding box transition event in which a bounding box associated with a particular one of one or more detected parked vehicles in the vicinity of the connected vehicle 475 crosses an image-frame boundary over a sequence of image frames; or (2) receiving, from the connected vehicle 475, the vehicle position data 380 and sensor data 470, performing object detection and tracking on the sensor data 470 to generate the vehicle detection and tracking data 370, and detecting, from the vehicle detection and tracking data 370, at least one bounding box transition event.

Figure 5:
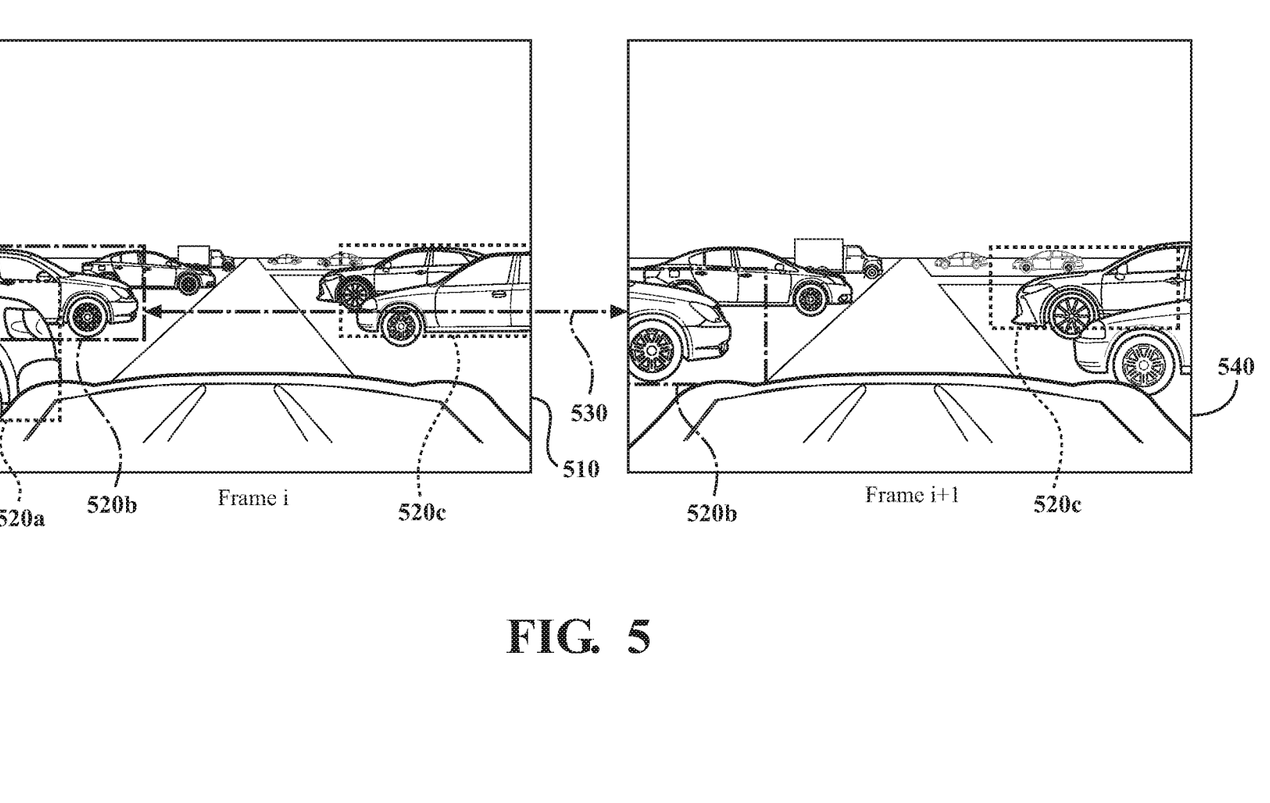
FIG. 5 illustrates tracking detected parked vehicles in the vicinity of a connected vehicle, in accordance with an illustrative embodiment of the invention.
Figure 6:
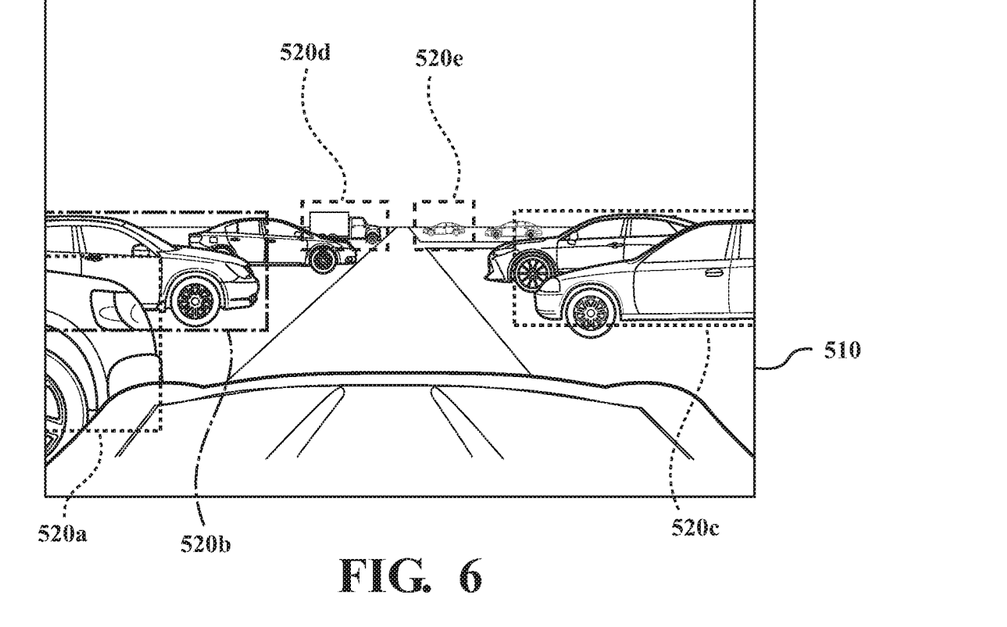
FIG. 6 illustrates filtering out detected parked vehicles whose bounding boxes fall below a predetermined size threshold, in accordance with an illustrative embodiment of the invention.
Figure 7:
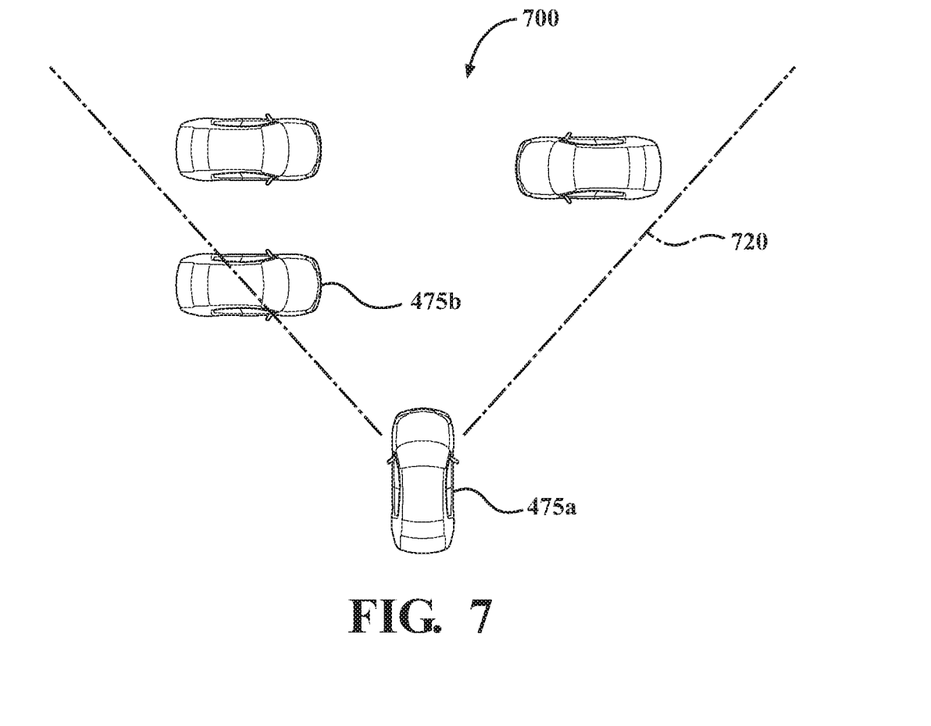
FIG. 7 illustrates a bounding box vanishing event, in accordance with an illustrative embodiment of the invention.

In an embodiment such as that discussed above in connection with FIG. 2 in which image-based vehicle detection 210 is performed at the server (parking availability system 400), input module 430 begins by using a real-time object-detection algorithm such as YOLO to detect two-dimensional (2D) bounding boxes around vehicles in input images included in sensor data 470 (see FIGS. 5-7 for examples of bounding boxes). Input module 430 uses an object-tracking algorithm to track bounding boxes associated with detected parked vehicles across adjacent image frames. The object-detection algorithm mentioned above typically processes each image frame individually. However, to mitigate the risk of "counting" the same detected parked vehicle multiple times, it is helpful to identify whether a pair of bounding boxes in adjacent image frames belong to the same detected parked vehicle. FIG. 5 shows an example of object tracking between a pair of adjacent image frames, in accordance with an illustrative embodiment of the invention. In this example, the object-detection algorithm has identified, in an image frame 510, parked vehicles enclosed by bounding box 520*a*, bounding box 520*b*, and bounding box 520*c*, respectively. The bounding box 520*b* in Frames i (510) and i+1 (540) are associated with each other (i.e., recognized by the system as corresponding to the same parked vehicle) through the vehicle tracking operation 530.

In some embodiments, input module 430 includes further instructions that when executed by the one or more processors 410 cause the one or more processors 410 to filter (remove), from one or more detected parked vehicles in the vehicle detection and tracking data 370, at least one detected parked vehicle whose associated bounding box is smaller than a predetermined size threshold. FIG. 6 shows an example in which two distant detected parked vehicles enclosed by bounding boxes 520*d* and 520*e*, respectively, have been filtered out. In one embodiment, the predetermined size threshold is 10% of the overall height of the image frame, and detected parked vehicles having associated bounding boxes smaller than that threshold are removed from bounding-box-transition-event reporting by the connected vehicles 475 in the embodiment discussed above in connection with FIG. 1. In the embodiment discussed above in connection with FIG. 2, detected parked vehicles having associated bounding boxes smaller than the 10% threshold are removed from bounding-box-transition-event analysis performed at the server (parking availability system 400). In some embodiments, the predetermined size threshold can be adjusted based on the distance from the camera 110 to nearby parking spaces within the camera's field of view. This helps to mitigate the risk of counting, as parked vehicles, other vehicles that are also seeking vacant parking spaces.

Figure 8:
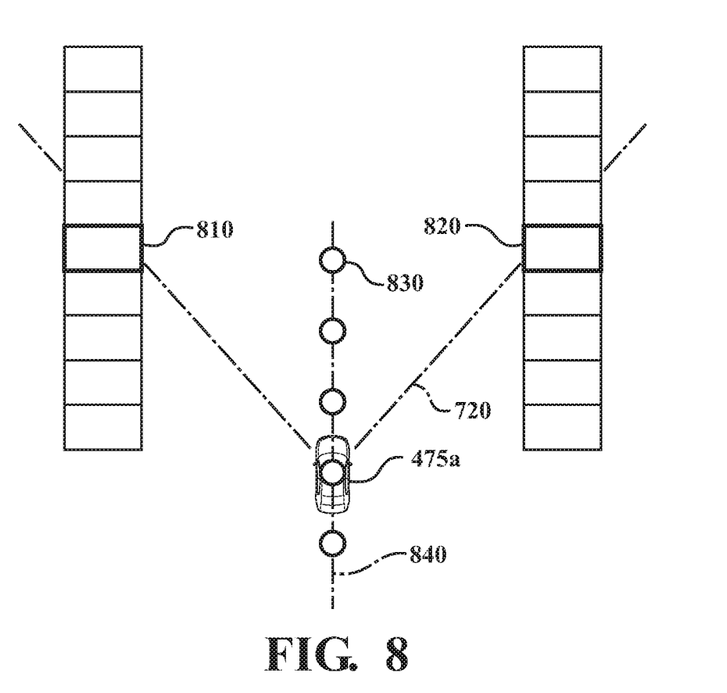
FIG. 8 further illustrates a bounding box vanishing event, in accordance with an illustrative embodiment of the invention.

In an embodiment like that discussed above in connection with FIG. 2, another aspect of the image-based vehicle detection 210 performed by input module 430 is detecting bounding box transition events. FIG. 7 illustrates one type of bounding box transition event—a bounding box vanishing event 700. In the example of FIG. 7, connected vehicle 475*a* includes a front-facing camera 110 with a field of view 720. As shown in FIG. 7, when a bounding box associated with connected vehicle 475*b* vanishes from view beyond the left image-frame boundary, it is likely that the corresponding parked vehicle 475*b* is at the boundary of the camera's field of view 720. This provides a positional frame of reference that can be matched with map data during the map-matching operation described below in connection with map-matching module 440. FIG. 8 diagrams a bounding box vanishing event more generally. In FIG. 8, connected vehicle 475*a* travels along a trajectory 840. Left captured spot 810 is associated with the left edge of the image frame, and right captured spot 820 is associated with the right edge of the image frame captured by a front-facing camera 110 (not shown in FIG. 8). The left captured spot 810 and the right captured spot 820 are the locations at which a detected and tracked parked vehicle will vanish from view across the relevant image-frame boundary. In this example, image-capture position 830 is the position at which a front-facing camera 110 captured an image. Input module 430 is able, through geometric calculations, to identify left captured spot 810 and right captured spot 820 based on a knowledge of the field of view 720 of the camera 110.

Figure 9:
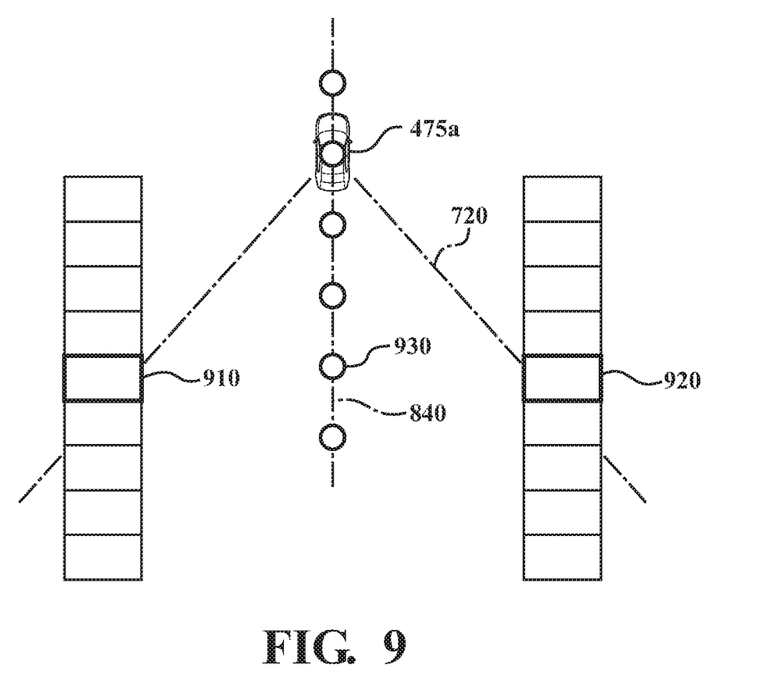
FIG. 9 illustrates a bounding box entry event, in accordance with an illustrative embodiment of the invention.

Another type of bounding box transition event that input module 430 can detect in the vehicle detection and tracking data 370 is a bounding box entry event. An example of a bounding box entry event is illustrated in FIG. 9. In FIG. 9, connected vehicle 475*a* is proceeding along a trajectory 840. Right captured spot 910 is associated with the right edge of the image frame, and left captured spot 920 is associated with the left edge of the image frame captured by a rear-facing camera 110 (not shown in FIG. 9). The right captured spot 910 and the left captured spot 920 are the locations where a detected parked vehicle comes into view of the rear-facing camera 110 across the relevant image-frame boundary. Image-capture position 930 is the position at which the rear-facing camera 110 captured an image. As with a bounding box vanishing event, input module 430 is able, through geometric calculations, to identify right captured spot 910 and left captured spot 920 based on a knowledge of the field of view 720 of the rear-facing camera 110.

Figure 10:
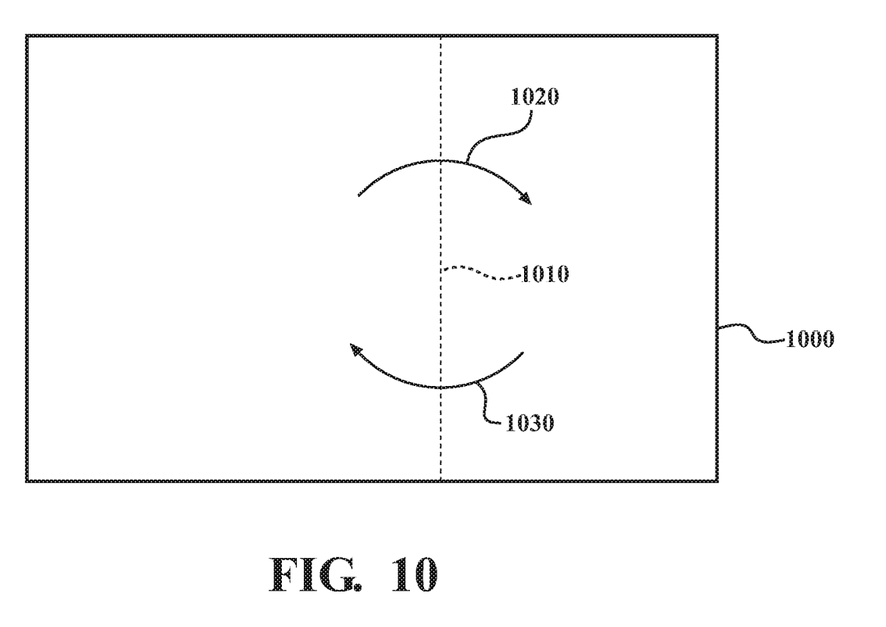
FIG. 10 illustrates an image-frame boundary that lies between the left and right edges of the image frame for the triggering of a bounding box transition event, in accordance with an illustrative embodiment of the invention.

In another embodiment, a connected vehicle 475 includes side cameras 110 that point in a direction that is substantially perpendicular to the direction of travel. In such an embodiment, one or more predetermined image-frame boundaries (vertical lines) can be specified that lie between the left and right edges of the image frame. An example of this is illustrated in FIG. 10. In FIG. 10, image frame 1000 has a predetermined image-frame boundary 1010, which is shown, in this example, in an arbitrary location within the image frame 1000. In this embodiment, input module 430, in performing image-based vehicle detection 210, can detect bounding box transition events in which a tracked bounding box associated with a detected parked vehicle crosses the image-frame boundary 1010 in either direction—from left to right (1020) or right to left (1030). The concept illustrated in FIG. 10 generalizes to multiple predetermined image-frame boundaries like image-frame boundary 1010. Like the bounding box vanishing events and the bounding box entry events discussed above, these bounding box transition events associated with side-facing cameras 110 can also provide a positional frame of reference to the map-matching function.

In an embodiment such as that discussed above in connection with FIG. 1, the object-detection, object-tracking, filtering, and bounding-box-transition-event-detection operations discussed above are performed by the vehicle computing system 105 of a connected vehicle 475 in connection with image-based vehicle detection 125. Though those operations are performed at the vehicle computing system 105, the underlying algorithms and computations are similar to those discussed above. In some embodiments, parking availability system 400 receives bounding-box-transition-event reports and vehicle position data 380 from participating connected vehicles 475. In a different embodiment, parking availability system 400 additionally receives, from participating connected vehicles 475, bounding-box information (image pixels corresponding to the bounding boxes 520) for all detected and tracked parked vehicles.

Map-matching module 440 generally includes instructions that when executed by the one or more processors 410 cause the one or more processors 410 to generate updated parking-space availability data 155 for a parking facility by performing map matching to associate the vehicle position data 380 and at least one bounding box transition event with one or more parking spaces in a parking map 145 that corresponds to a parking facility. From each of the participating connected vehicles 475, parking availability system 400 obtains vehicle positions and heading angles at the time the input images were captured, along with bounding box transition events detected at those positions (see the above discussion of bounding box transition events). Thus, the parking-space availability measurements from a participating connected vehicle 475 can be represented, in one embodiment, by a series of 4-tuples (t, p, l, r), where t is a timestamp, p is the measured vehicle position and heading angle, and l and r are binary variables describing whether the vehicle 475 detected a bounding box vanishing or entry event at the left and right image boundaries, respectively. In an embodiment such as that discussed above in connection with FIG. 10 (side-facing cameras 110), an n-tuple can be defined in accordance with such an embodiment.

Referring once again to FIGS. 8 and 9, assume that a bounding box transition event (e.g., a bounding box vanishing event or a bounding box entry event) was detected at the left or right edge of the image frame at time t. Map-matching module 440 first analyzes the parking map 145 to find the first parking space along the left (or right) boundary of the camera field of view 720 (referred to herein as a "captured space"). The boundary of the camera's field of view 720 can be estimated based on the position and heading angle of the participating vehicle at time t as well as the viewing angle of the camera 110, as defined in its hardware specification. Assuming that the detected parked vehicle associated with the bounding box transition event is likely to be on the boundary of the camera's field of view, a heuristic can be introduced that the detected parked vehicle is parked in the current captured space. An emerging technology makes it possible to estimate the distance to the surrounding parked vehicles using a monocular on-board camera. In some embodiments, machine-learning techniques can be employed to infer the depth of each pixel in the input images. Such monocular-camera-based depth estimation techniques can further improve the accuracy of parking availability measurements, when combined with the techniques described above.

In some situations, the status of a particular parking space can change from "occupied" to "available" or vice versa as multiple reports are received from multiple participating connected vehicles 475 over time. For example, consider the simple case of a parking facility with only three parking spaces, $S_1$, $S_2$, and $S_3$. At time $T_1$, $V_1$ reports that a vehicle is occupying $S_1$ (in some embodiments, map-matching module 440 presumes that $S_2$ and $S_3$ are not occupied). At time $T_2$, $V_2$ reports that a vehicle is occupying $S_2$ (in this embodiment, the server presumes that $S_1$ and $S_3$ are not occupied). At time $T_3$, $V_3$ reports that a vehicle is occupying $S_3$ (in this embodiment, the server presumes that $S_1$ and $S_2$ are not occupied). Based on these reports and presumptions, map-matching module 440 would estimate that, at time $T_3$, $S_1$ and $S_2$ are available and that $S_3$ is occupied, based on the most recent report from $V_3$.

Figure 11:
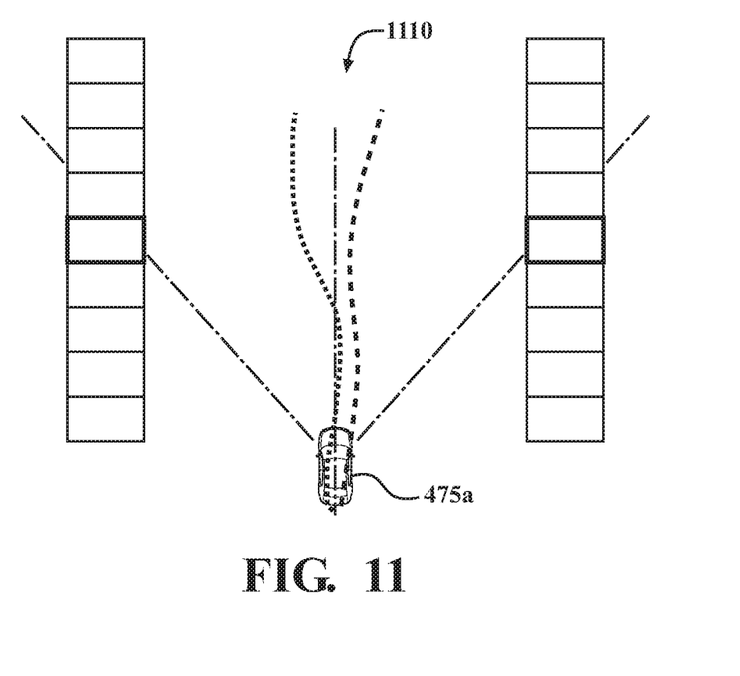
FIG. 11 illustrates vehicle-position-error mitigation, in accordance with an illustrative embodiment of the invention.

In some embodiments, map-matching module 440 includes further instructions that when executed by the one or more processors 410 cause the one or more processors 410 to apply an error mitigation technique to account for inaccuracies in the vehicle position data 380. This addresses the challenge that a bounding box transition event might be associated with an incorrect parking space, if the participating connected vehicle's position and heading angle (pose) information includes errors. To mitigate such measurement errors, multiple possible trajectories 1110 of a participating connected vehicle 475, based on a pre-defined error model (e.g., Gaussian noise), can be simulated, as illustrated in FIG. 11. In this example, the trajectory of the participating connected vehicle 475 is modeled using a Gaussian distribution.

At designated time intervals τ, the server (parking availability system 400) generates n hypotheses about the vehicle's actual trajectory for the last time interval τ. A hypothetical trajectory can be generated by adding random noise to measured positions and heading angles. Each hypothesis i is associated with a normalized likelihood value $w_i$ ($\Sigma_i w_i=1$). Both the random noise and likelihood values are chosen based on predetermined measurement-error models.

For each hypothetical trajectory i, the server applies the map-matching algorithm described above. Assume that m bounding box transition events are detected at the left boundary (edge) of the camera field of view 720 during the last time interval τ. Let $E_{i,j,k}$ be a binary variable that becomes 1 if the j-th bounding box transition event is associated with the parking space k with a given hypothetical trajectory i. Otherwise $E_{i,j,k}$ becomes 0. The system defines an occupancy likelihood $o_k$ of each parking space k as $o_k=E_{i,j} w_i *E_{i,j,k}$. Then, the system sorts the parking spaces in an ascending order of the likelihood $o_k$ and associates the m bounding box transition events with m spaces having the largest likelihood values. A similar process can also be applied to the right boundary (edge) of the camera's field of view 720.

Communication module 450 generally includes instructions that when executed by the one or more processors 410 cause the one or more processors 410 to transmit the updated parking-space availability data 155 for the parking facility to one or more participating connected vehicles 475. The participating connected vehicles 475 receiving the updated parking-space availability data 155 can present the information to a driver via an onboard user interface that includes graphics, text, and/or audio, depending on the embodiment.

If a receiving connected vehicle 475 is an autonomous vehicle, the vehicle's navigation and autonomous-driving subsystems can make use of the updated parking-space availability data 155 to park the vehicle in an available parking space.

Some embodiments include fusion module 460. Fusion module 460 generally includes instructions that when executed by the one or more processors 410 cause the one or more processors 410 to refine the updated parking-space availability data 155 by fusing the updated parking-space availability data 155 with historical parking-space availability data for the applicable parking facility before the updated parking-space availability data 155 is transmitted to the one or more participating connected vehicles 475, as discussed above.

Figure 12:
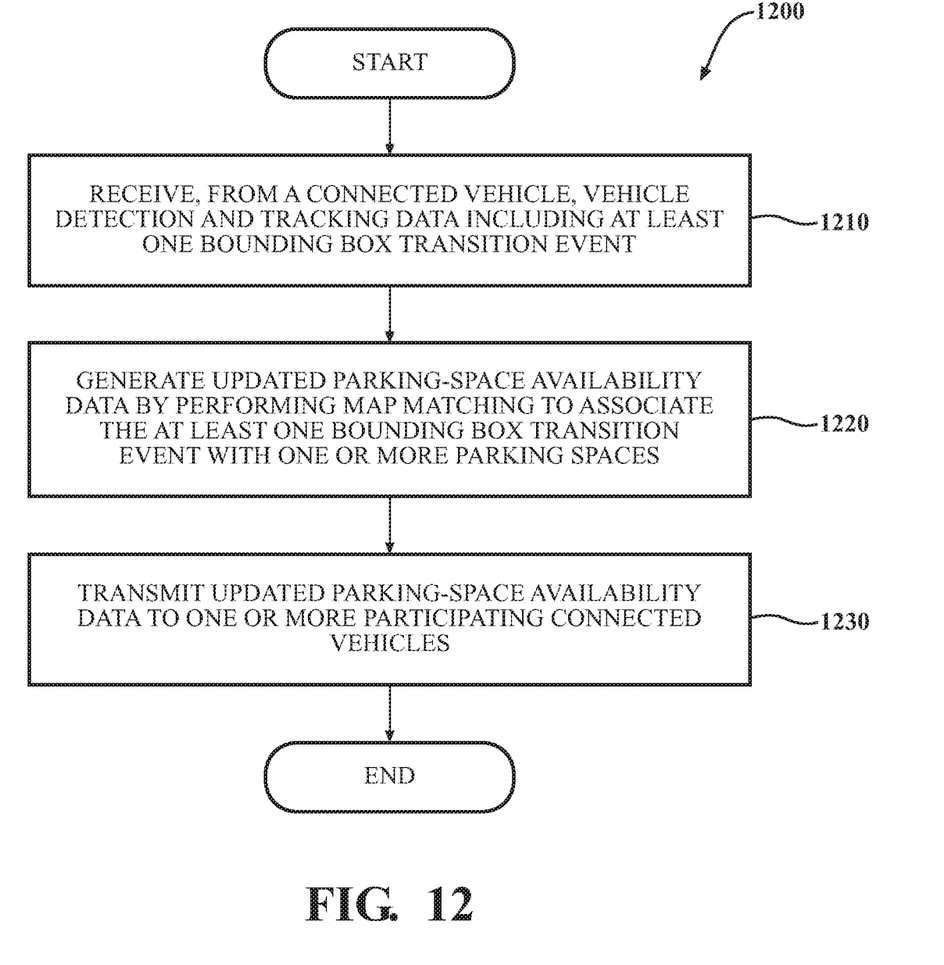
FIG. 12 is a flowchart of a method of identifying available parking spaces using connected vehicles, in accordance with an illustrative embodiment of the invention.

FIG. 12 is a flowchart of a method 1200 of identifying available parking spaces using connected vehicles, in accordance with an illustrative embodiment of the invention. Method 1200 will be discussed from the perspective of the parking availability system 400 in FIG. 4 with reference to some of the other figures. While method 1200 is discussed in combination with parking availability system 400, it should be appreciated that method 1200 is not limited to being implemented within parking availability system 400, but parking availability system 400 is instead one example of a system that may implement method 1200.

At block 1210, input module 430 receives, from a connected vehicle, vehicle position data 380 and vehicle detection and tracking data 370 including at least one bounding box transition event in which a bounding box 520 associated with a particular one of one or more detected parked vehicles in the vicinity of the connected vehicle crosses an image-frame boundary over a sequence of image frames. As discussed above, the vehicle position data 380 can include a position and a pose (heading angle) for the reporting connected vehicle 475. In some embodiments, the vehicle detection and tracking data 370 includes, in addition to bounding box transition events, bounding box information (pixels) for each detected parked vehicle that is not filtered due to its size in the image frame. Different types of bounding box transition events, such as bounding box vanishing events and bounding box entry events, are discussed above in connection with FIGS. 7-10.

At block 1220, map-matching module 440 generates updated parking-space availability data 155 for a parking facility by performing map matching to associate the vehicle position data 380 and the at least one bounding box transition event with one or more parking spaces in a parking map that corresponds to the parking facility. As discussed above, from each of the participating connected vehicles 475, parking availability system 400 obtains vehicle positions and heading angles at the time the input images were captured (vehicle position data 380), along with bounding box transition events detected at those positions. Thus, the parking-space availability measurements from a participating connected vehicle 475 can be represented, in one embodiment, by a series of 4-tuples (t, p, l, r), where t is a timestamp, p is the measured vehicle position and heading angle, and l and r are binary variables describing whether the vehicle 475 detected a bounding box vanishing or entry event at the left and right image boundaries, respectively. In an embodiment such as that discussed above in connection with FIG. 10 (side-facing cameras 110), an n-tuple can be defined in accordance with such an embodiment.

At block 1230, communication module 450 transmits the updated parking-space availability data 155 for the parking facility to one or more participating connected vehicles 475.

As discussed above, the participating connected vehicles 475 receiving the updated parking-space availability data 155 can present the information to a driver via an onboard user interface that includes graphics, text, and/or audio, depending on the embodiment. If a receiving connected vehicle 475 is an autonomous vehicle, the vehicle's navigation and autonomous-driving subsystems can make use of the updated parking-space availability data 155 to park the vehicle in an available parking space.

As discussed above, in some embodiments, fusion module 460 refines the updated parking-space availability data 155 by fusing the updated parking-space availability data 155 with historical parking-space availability data for the applicable parking facility before the updated parking-space availability data 155 is transmitted to the one or more participating connected vehicles 475.

As also discussed above, map-matching module 440, in some embodiments, applies an error mitigation technique to account for inaccuracies in the vehicle position data 380. This addresses the challenge that a bounding box transition event might be associated with the wrong parking space, if the participating connected vehicle's position and heading angle (pose) information includes errors. To mitigate such measurement errors, multiple possible trajectories 1110 of a participating connected vehicle 475, based on a pre-defined error model (e.g., Gaussian noise), can be simulated, as illustrated in FIG. 11. In the example shown in FIG. 11, the trajectory of the participating connected vehicle 475 is modeled using a Gaussian distribution.

Figure 13:
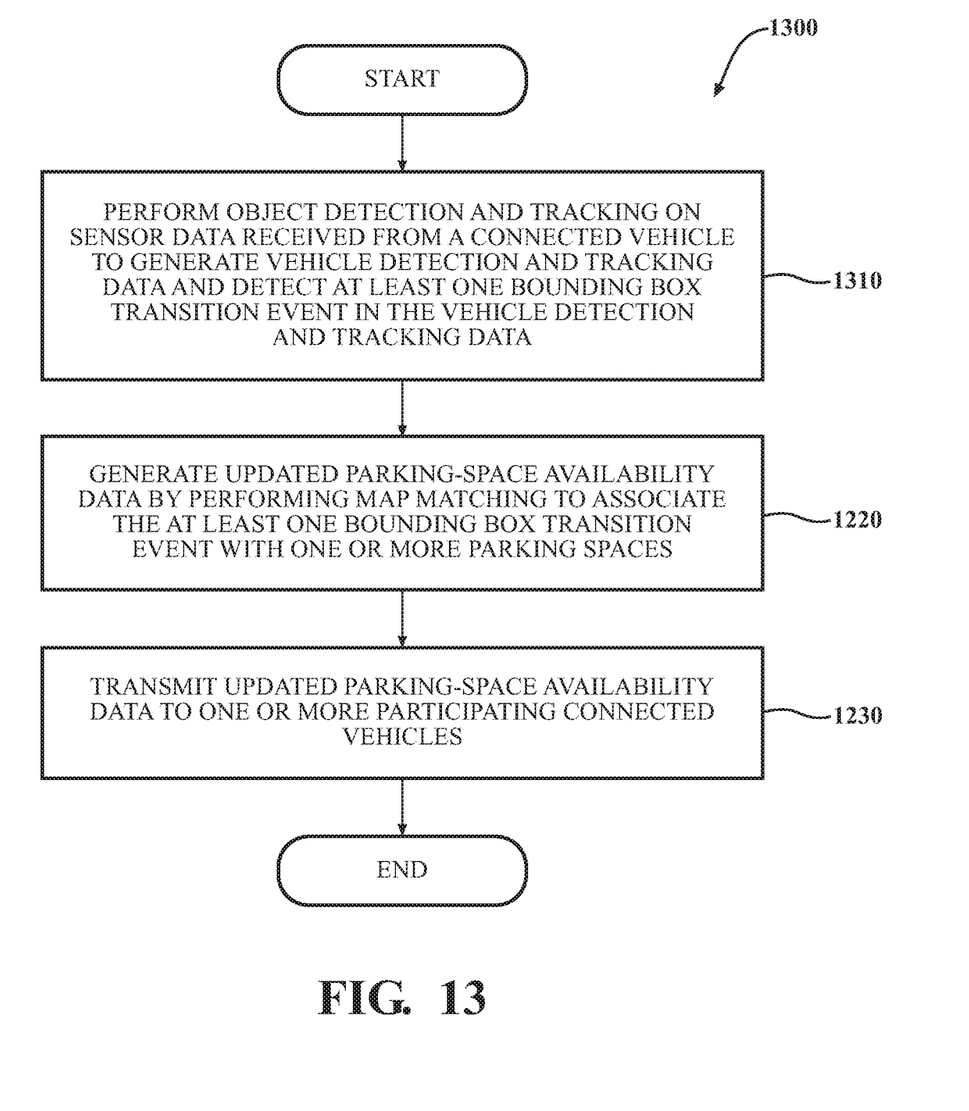
FIG. 13 is a flowchart of a method of identifying available parking spaces using connected vehicles, in accordance with another illustrative embodiment of the invention.

FIG. 13 is a flowchart of a method 1300 of identifying available parking spaces using connected vehicles, in accordance with an illustrative embodiment of the invention. Method 1300 will be discussed from the perspective of the parking availability system 400 in FIG. 4 with reference to some of the other figures. While method 1300 is discussed in combination with parking availability system 400, it should be appreciated that method 1300 is not limited to being implemented within parking availability system 400, but parking availability system 400 is instead one example of a system that may implement method 1300.

Method 1300 proceeds in a manner similar to method 1200 discussed above at blocks 1220 and 1230, and method 1300 can include fusion and error-mitigation operations similar to those discussed above in connection with method 1200, depending on the particular embodiment. At block 1310, input module 430 receives, from a connected vehicle 475, vehicle position data 380 and sensor data 470, performs object detection and tracking on the sensor data 470 to generate the vehicle detection and tracking data 370, and detects, from the vehicle detection and tracking data 370, at least one bounding box transition event.

As discussed above, in some embodiments (e.g., the embodiment discussed above in connection with FIG. 2), input module 430 filters, from one or more detected parked vehicles in the vehicle detection and tracking data 370, at least one detected parked vehicle whose associated bounding box is smaller than a predetermined size threshold. FIG. 6 shows an example in which two distant detected parked vehicles enclosed by bounding boxes 520*d* and 520*e*, respectively, have been filtered out.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for identifying available parking spaces using connected vehicles, the system comprising:
   one or more processors; and
   a memory communicably coupled to the one or more processors and storing:
   an input module including instructions that when executed by the one or more processors cause the one or more processors to perform one of:
      receiving, from a connected vehicle, vehicle position data and vehicle detection and tracking data including at least one bounding box transition event in which a bounding box associated with a particular one of one or more detected parked vehicles in a vicinity of the connected vehicle crosses an image-frame boundary over a sequence of image frames, wherein the image-frame boundary is one of a left edge and a right edge and the at least one bounding box transition event is one of a bounding box vanishing event in which the bounding box associated with the particular one of the one or more detected parked vehicles vanishes from view beyond the image-frame boundary over the sequence of image frames and a bounding box entry event in which the bounding box associated with the particular one of the one or more detected parked vehicles comes into view across the image-frame boundary over the sequence of image frames; and
      receiving, from the connected vehicle, the vehicle position data and sensor data, performing object detection and tracking on the sensor data to generate the vehicle detection and tracking data, and detecting, from the vehicle detection and tracking data, the at least one bounding box transition event;
   a map-matching module including instructions that when executed by the one or more processors cause the one or more processors to generate updated parking-space availability data for a parking facility by performing map matching to associate the vehicle position data and the at least one bounding box transition event with one or more parking spaces in a parking map that corresponds to the parking facility; and
   a communication module including instructions that when executed by the one or more processors cause the one or more processors to transmit the updated parking-space availability data for the parking facility to one or more participating connected vehicles.

2. The system of claim 1, wherein the input module includes further instructions that when executed by the one or more processors cause the one or more processors to filter, from the one or more detected parked vehicles, at least one detected parked vehicle whose associated bounding box is smaller than a predetermined size threshold.

3. The system of claim 1, wherein the map-matching module includes further instructions that when executed by the one or more processors cause the one or more processors to apply an error mitigation technique to account for inaccuracies in the vehicle position data, the error mitigation technique including modeling a trajectory of the connected vehicle using a Gaussian distribution.

4. The system of claim 1, wherein the image-frame boundary is a predetermined vertical line that lies between a left edge and a right edge of an image frame.

5. The system of claim 1, wherein the vehicle detection and tracking data received from the connected vehicle includes bounding-box information associated with the one or more detected parked vehicles.

6. The system of claim 1, further comprising a fusion module including instructions that when executed by the one or more processors cause the one or more processors to refine the updated parking-space availability data by fusing the updated parking-space availability data with historical parking-space availability data for the parking facility before the updated parking-space availability data is transmitted to the one or more participating connected vehicles.

7. The system of claim 1, wherein the parking facility is one of a parking garage and an outdoor parking lot.

8. The system of claim 1, wherein the system is implemented in one of a cloud server and an edge server.

9. A non-transitory computer-readable medium for identifying available parking spaces using connected vehicles and storing instructions that when executed by one or more processors cause the one or more processors to:
   perform one of:
      receiving, from a connected vehicle, vehicle position data and vehicle detection and tracking data including at least one bounding box transition event in which a bounding box associated with a particular one of one or more detected parked vehicles in a vicinity of the connected vehicle crosses an image-frame boundary over a sequence of image frames, wherein the image-frame boundary is one of a left edge and a right edge and the at least one bounding box transition event is one of a bounding box vanishing event in which the bounding box associated with the particular one of the one or more detected parked vehicles vanishes from view beyond the image-frame boundary over the sequence of image frames and a bounding box entry event in which the bounding box associated with the particular one of the one or more detected parked vehicles comes into view across the image-frame boundary over the sequence of image frames; and receiving, from the connected vehicle, the vehicle position data and sensor data, performing object detection and tracking on the sensor data to generate the vehicle detection and tracking data, and detecting, from the vehicle detection and tracking data, the at least one bounding box transition event;

generate updated parking-space availability data for a parking facility by performing map matching to associate the vehicle position data and the at least one bounding box transition event with one or more parking spaces in a parking map that corresponds to the parking facility; and transmit the updated parking-space availability data for the parking facility to one or more participating connected vehicles.

10. A method of identifying available parking spaces using connected vehicles, the method comprising:

performing one of:

receiving, from a connected vehicle, vehicle position data and vehicle detection and tracking data including at least one bounding box transition event in which a bounding box associated with a particular one of one or more detected parked vehicles in a vicinity of the connected vehicle crosses an image-frame boundary over a sequence of image frames, wherein the image-frame boundary is one of a left edge and a right edge and the at least one bounding box transition event is one of a bounding box vanishing event in which the bounding box associated with the particular one of the one or more detected parked vehicles vanishes from view beyond the image-frame boundary over the sequence of image frames and a bounding box entry event in which the bounding box associated with the particular one of the one or more detected parked vehicles comes into view across the image-frame boundary over the sequence of image frames; and receiving, from the connected vehicle, the vehicle position data and sensor data, performing object detection and tracking on the sensor data to generate the vehicle detection and tracking data, and detecting, from the vehicle detection and tracking data, the at least one bounding box transition event;

generating updated parking-space availability data for a parking facility by performing map matching to associate the vehicle position data and the at least one bounding box transition event with one or more parking spaces in a parking map that corresponds to the parking facility; and transmitting the updated parking-space availability data for the parking facility to one or more participating connected vehicles.

11. The method of claim 10, further comprising filtering, from the one or more detected parked vehicles, at least one detected parked vehicle whose associated bounding box is smaller than a predetermined size threshold.

12. The method of claim 10, further comprising applying an error mitigation technique to account for inaccuracies in the vehicle position data, the error mitigation technique including modeling a trajectory of the connected vehicle using a Gaussian distribution.

13. The method of claim 10, wherein the image-frame boundary is a predetermined vertical line that lies between a left edge and a right edge of an image frame.

14. The method of claim 10, further comprising refining the updated parking-space availability data by fusing the updated parking-space availability data with historical parking-space availability data for the parking facility before the updated parking-space availability data is transmitted to the one or more participating connected vehicles.

* * * * *